US007003879B2

(12) United States Patent
Smith et al.

(10) Patent No.: US 7,003,879 B2
(45) Date of Patent: Feb. 28, 2006

(54) STAGGERED ROWS IN A CT OR SERPENTINE FIN CORE WITH A ROUND TUBE TO HEADER JOINT

(75) Inventors: Geoff Smith, Jackson, TN (US); Jay Korth, Kenosha, WI (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/610,936

(22) Filed: Jun. 30, 2003

(65) Prior Publication Data

US 2004/0068870 A1  Apr. 15, 2004

Related U.S. Application Data

(60) Provisional application No. 60/392,995, filed on Jun. 28, 2002.

(51) Int. Cl.
*B23P 15/26* (2006.01)
*B21D 53/02* (2006.01)

(52) U.S. Cl. ................ 29/890.043; 29/890.03

(58) Field of Classification Search ........... 29/890.043, 29/890.054, 890.052, 890.03; 165/173, 163, 165/DIG. 472
See application file for complete search history.

(56) References Cited

U.S. PATENT DOCUMENTS 4,815,535 A * 3/1989 Hagemeister ............... 165/173

* cited by examiner

*Primary Examiner*—John C. Hong
(74) *Attorney, Agent, or Firm*—The Webb Law Firm

(57) ABSTRACT

The present invention provides a method of at least one of increasing airflow around a plurality of tubes in a heat exchanger, and increasing the web in a header around such plurality of tubes, wherein the method includes the steps of providing a predetermined plurality of tubes having a predetermined end configuration, and a header having a predetermined number of openings. The predetermined number of openings are configured in a predetermined staggered array corresponding to the predetermined plurality of tubes, disposed in a heat exchanger. Finally, the method secures an end of each predetermined plurality of tubes into the predetermined number of openings in said header.

15 Claims, 1 Drawing Sheet

STAGGERED ROWS IN A CT OR SERPENTINE FIN CORE WITH A ROUND TUBE TO HEADER JOINT

CROSS-REFERENCE TO RELATED APPLICATIONS

This application claims the benefit of U.S. Provisional Application No. 60/392,995 filed Jun. 28, 2002.

FIELD OF THE INVENTION

The present invention generally relates to, but is not limited to, radiators, shell and tube type heat exchangers, charge air coolers, oil coolers, and fuel coolers.

More particularly, the invention relates to the staggered rows in a CT or Serpentine fin core with a round tube to header joint applications. Even more particularly, the present invention relates to a method of at least one of increasing airflow around a plurality of tubes in a heat exchanger, and increasing the web in a header around such plurality of tubes.

BACKGROUND OF THE INVENTION

Current CT style radiators have a plurality of tubes that are arranged in an array that are perpendicular to each other. This array is not equally spaced about the centerline of the tube ends, and therefore results in having different spacing between the tube pitch, and row pitch. Each tube column starts at the same point with respect to the airflow, at the front of the core. (See FIG. 1) The tube pitch, and the row pitch, is symmetrical, at 90-degrees about the centerline, for each row and column. This alignment as shown in FIG. 1 reduces the airflow over each tube. Since the tube array is laid out as shown with minimal distance between the tube pitches this causes an increase in manufacturing cost due to the tight tolerance stack between the tangents of the tube ends.

SUMMARY OF THE INVENTION

The present invention provides a method of at least one of increasing airflow around a plurality of tubes in a heat exchanger, and increasing the web in a header around such plurality of tubes, wherein the method includes the steps of providing a predetermined plurality of tubes having a predetermined end configuration, and a header having a predetermined number of openings. The predetermined number of openings are configured in a predetermined staggered array corresponding to the predetermined plurality of tubes, disposed in a heat exchanger. Finally, the method secures an end of each predetermined plurality of tubes into the predetermined number of openings in such header.

OBJECTS OF THE INVENTION

It is, therefore, a primary object of the present invention to provide staggered rows in a CT or Serpentine fin core with a round tube to header joint that increases airflow around a predetermined plurality of tubes.

Another object of this invention is to provide staggered rows in a CT or Serpentine fin core with a round tube to header joint which permit a reduction in tolerance between the column pitches to aid in manufacturing.

Another object of this invention is to provide staggered rows in a CT or Serpentine fin core with a round tube to header joint which increases the web between the tubes to aid in airflow around such tubes.

Yet another object of this invention is to provide staggered rows in a CT or Serpentine fin core with a round tube to header joint which improves heat exchanger lifecycle.

Yet another object of this invention is to provide staggered rows in a CT or Serpentine fin core with a round tube to header joint which enables additional tubes to be placed in the same amount of envelope space.

Still another object of this invention is to provide staggered rows in a CT or Serpentine fin core with a round tube to header joint which allows for smaller more compact heat exchanger designs.

In addition to the above-described objects and advantages of the staggered array of this invention, various other objects and advantages of the present invention will become more readily apparent to those persons who are skilled in the same and related arts from the following more detailed description of the invention, particularly, when such description is taken in conjunction with the attached drawing figures and the appended claims.

DETAILED DESCRIPTION OF THE PREFERRED EMBODIMENT

Figure 1:
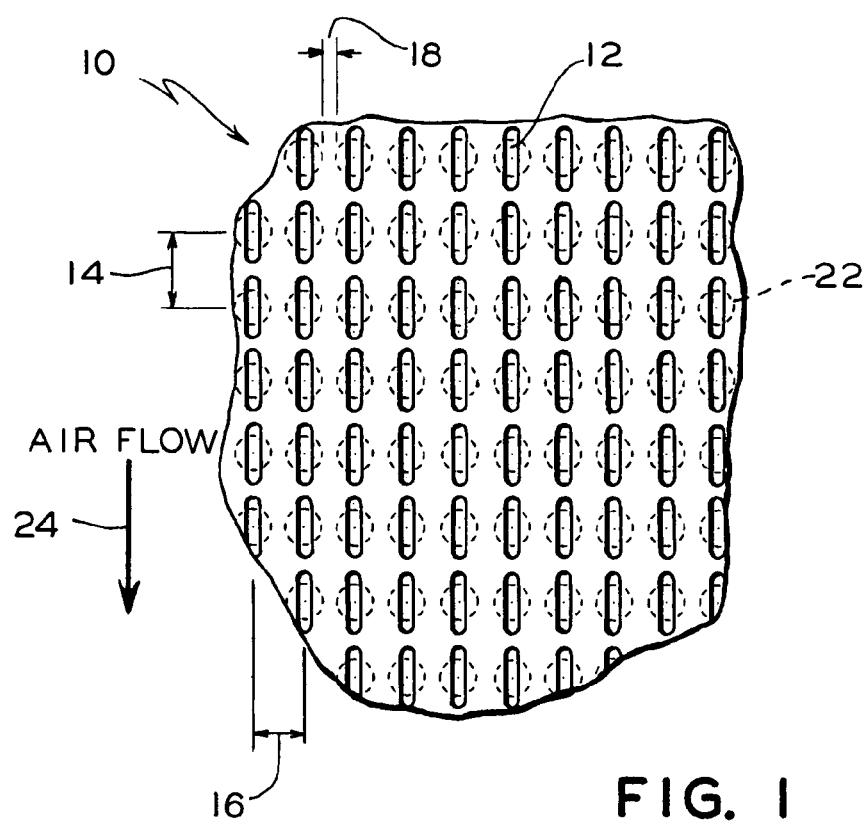
FIG. 1 is a detailed view of the tube column layout for a prior art non-staggered array.

Prior to proceeding to a much more detailed description of the present invention, it should be noted that identical components which have identical functions have been identified with identical reference numerals throughout the several views illustrated in the drawing figures for the sake of clarity and understanding of the invention.

Referring initially to FIG. 1, which illustrates the prior art or non-staggered array. Reference number 10 generally indicates a non-staggered array constructed according to the prior art. The non-staggered array 10 generally includes a plurality of tubes 12.

Figure 2:
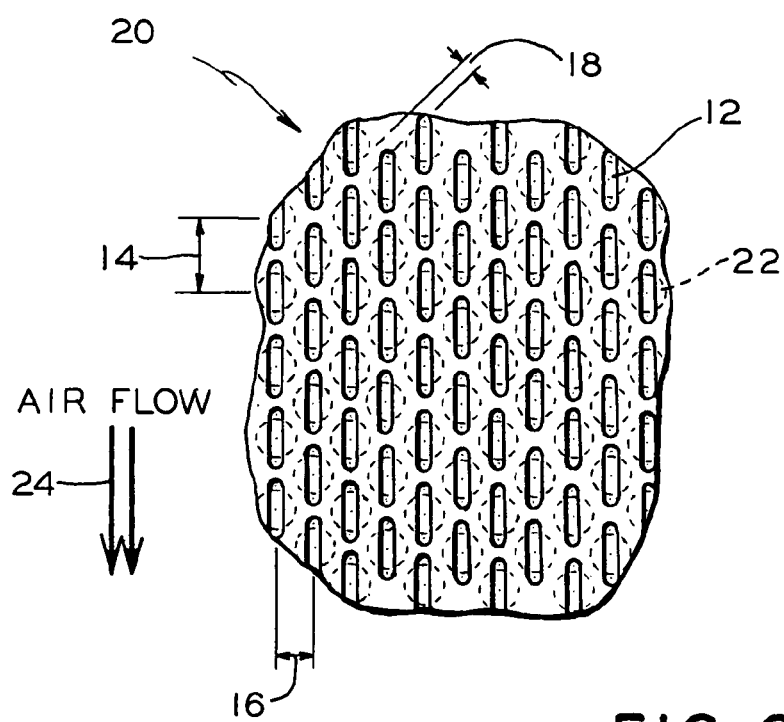
FIG. 2 is a detailed view of the tube column layout for a staggered array according to the present invention.

Now reference is made more particularly to FIG. 2, which illustrates a presently preferred arrangement of the invention. Reference number 20 generally indicates a staggered array constructed according to the invention. The method of at least one of increasing airflow 24 around a plurality of tubes 12 in a heat exchanger, and increasing the web material 18 in a header around such plurality of tubes 12 includes the steps of providing a predetermined plurality of tubes 12 having a predetermined end configuration. The steps further include providing a header having a predetermined number of openings 22, in a predetermined staggered array 20, corresponding to the predetermined plurality of tubes 12, disposed in such heat exchanger, and securing an end of each predetermined plurality of tubes 12 into the predetermined number of openings 22 in the header.

Forming the predetermined staggered array 20 includes the additional steps of identifying a direction of airflow 24. Upon determining the direction of airflow 24, determining at least one of a row pitch 14 and a tube pitch 16 of the predetermined number of openings, and aligning at least one of the row pitch 14 and the tube pitch 16 with respect to the direction of airflow 24. Forming the staggered array 20 further includes arranging the predetermined plurality of tubes 12 such that the row pitch 14 and the tube pitch 16 are spaced substantially identical, at about 45-degree increments, allowing for an acceptable amount of web material 18 between the predetermined number of openings 22. The acceptable amount of web material 18 between the predetermined number of openings 22 allows for predetermined operations to secure the predetermined plurality of tubes 12 into the predetermined plurality of openings 22 in the header. Wherein the predetermined operations include at least one of mechanical bonding and non-mechanical bonding. The mechanical bonding may consist of at least one of rolling and machining, and the non-mechanical bonding may consist of at least one of welding, brazing, and adhesive.

The predetermined end configuration of the predetermined plurality of tubes 12 is generally oblong in shape. However, the predetermined plurality of tubes 12 may also be generally oblong in shape along substantially an entire length thereof. A predetermined plurality of tubes 12 is considered to be at least two tubes.

A configuration of the predetermined number of openings 22 is created substantially identical to the predetermined end configurations of the predetermined plurality of tubes 12 creating a fluid seal. Creating the fluid seal is accomplished by at least one of a mechanical bond and a non-mechanical bond. Wherein the mechanical bond includes at least one of rolling and machining, and the non-mechanical bond includes at least one of welding, brazing, and adhesive.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

We claim:

1. A method of at least one of increasing airflow around a plurality of tubes in a heat exchanger, and increasing a web in a header around such plurality of tubes, said method comprising the steps of:
    a) providing a predetermined plurality of tubes having a predetermined end configuration
    b) inserting said predetermined end configuration into an opening of a header of such heat exchanger, said header having a predetermined number of openings disposed in a predetermined staggered array, wherein said header is formed by identifying a direction of airflow, determining at least one of a row pitch and a tube pitch of said predetermined number of openings, and aligning at least one of said row pitch and said tube pitch with respect to said airflow;
    c) arranging said predetermined plurality of tubes such that said row pitch and said tube pitch are spaced substantially identical; and
    d) securing an end of each said predetermined plurality of tubes into said predetermined number of openings in said header.

2. A method, according to claim 1, wherein forming said staggered array further includes arranging said predetermined plurality of tubes such that said row pitch and said tube pitch are spaced to allow for an acceptable amount of web material between said predetermined number of openings.

3. A method, according to claim 2, wherein said row pitch and said tube pitch are spaced at about 45-degree increments.

4. A method, according to claim 2, wherein said acceptable amount of web material between said predetermined number of openings allows for predetermined operations to secure said predetermined plurality of tubes into said predetermined plurality of openings in said header.

5. A method, according to claim 4, wherein said predetermined operations include at least one of a mechanical bonding and non-mechanical bonding said predetermined plurality of tubes ends into said predetermined plurality of openings.

6. A method, according to claim 5, wherein said mechanical bonding includes at least one of rolling and machining.

7. A method, according to claim 5, wherein said non-mechanical bonding includes at least one of welding, brazing, and adhesive.

8. A method, according to claim 1, wherein said predetermined end configuration is generally oblong in shape.

9. A method, according to claim 1, wherein said predetermined plurality of tubes provided in step (a) are generally oblong in shape along substantially an entire length thereof.

10. A method, according to claim 9, wherein said predetermined plurality of tubes provided in step (a) is at least two.

11. A method, according to claim 1, wherein configuring of said predetermined number of openings is created substantially identical to said predetermined end configurations of said predetermined plurality of tubes.

12. A method, according to claim 1, wherein step (d) further includes creating a fluid seal.

13. A method, according to claim 12, wherein creating said fluid seal is accomplished by at least one of a mechanical bond and a non-mechanical bond.

14. A method, according to claim 13, wherein said mechanical bond includes at least one of rolling and machining.

15. A method, according to claim 13, wherein said non-mechanical bond includes at least one of welding, brazing, and adhesive.

* * * * *